H. H. STYLL.
GLASSES.
APPLICATION FILED DEC. 7, 1912.
1,165,036.
Patented Dec. 21, 1915.
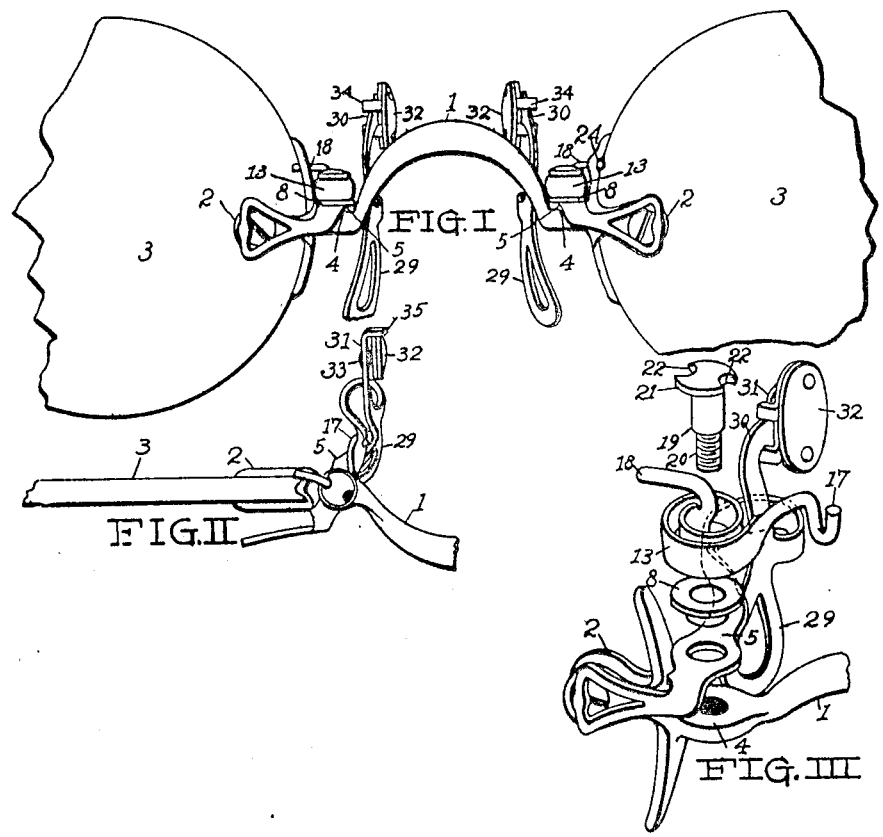
INVENTOR
HARRY H. STYLL

UNITED STATES PATENT OFFICE.

HARRY H. STYLL, OF SOUTHBRIDGE, MASSACHUSETTS.

GLASSES.

1,165,036.

Specification of Letters Patent. Patented Dec. 21, 1915.

Application filed December 7, 1912. Serial No. 735,419.

*To all whom it may concern:*

Be it known that I, HARRY H. STYLL, a citizen of the United States, residing at Southbridge, in the county of Worcester and State of Massachusetts, have invented certain new and useful Improvements in Glasses, of which the following is a specification.

My invention relates to improvements in glasses and has particular reference to that form of eyeglasses in which pivoted spring actuated nose guards are employed.

The leading object of my invention is the provision of an improved type of actuating spring, which may be readily applied to the mounting and which has its terminal portions so constructed as to permit of ready adjustment to vary the position or tension of the spring as desired.

A further object of the invention is the provision of improved means including interlocking parts on the spring and pivot for retaining the various parts in position in a neat and satisfactory manner.

Other objects and advantages of my improved construction of eyeglasses should be readily apparent by reference to the following description taken in connection with the accompanying drawings, and it will be understood that I may make any modifications in the specific details of construction shown and described within the scope of the appended claims without departing from or exceeding the spirit of my invention.

Figure I represents a view of a fingerpiece mounting embodying one form of my invention. Fig. II represents a fragmentary front plan view of the spring structure shown in Fig. I but illustrating a slightly different form of pad. Fig. III represents a fragmentary perspective view of one form of my mounting with the parts in disassembled relation. Fig. IV represents a plan view of the blank from which my improved spring may be formed. Fig. V represents a plan of the spring formed from said blank. Fig. VI represents a cross section of the widened portion of my spring. Fig. VII represents a slightly modified form of cross section; and Fig. VIII represents another modified cross section.

In the drawings, in which similar characters of reference are employed throughout to denote corresponding views, the numeral 1 denotes the bridge of a pair of glasses, said bridge bearing at its ends the clips 2 in which are mounted the lenses 3. The bridge is preferably formed adjacent the clips with the seat portions 4 on which are pivotally mounted the guard arms 5. The pivot bearings for the guard arms are preferably the members 6 which have a shoulder 7 bearing against the seat 4 and have a flange portion 8 to rest on the upper face of the lever 5 and prevent weaving movement thereof. In certain of the forms of my invention I have shown this bearing and washer member as having a securing screw passing downward therethrough, while in other forms I have shown the same as having depending therefrom the portion 9 fitting into a recess 10 in the bridge and having the screw 11 engaging the under face of the bridge and in threaded engagement with the depending portion 9 to securely fasten the device in position.

By reference to Figs. IV to VIII inclusive, it will be seen that I preferably form my spring from a piece of round stock 12 which has the central portion thereof 13 reduced in thickness and correspondingly widened, this reduction forming for example the cross section 14 shown in Fig. VI, and the cross section 15 shown in Fig. VII, or the cross section 16 shown in Fig. VIII. It will be understood, however, that I do not wish to limit myself to these particular cross sections but that I desire merely to so reduce the thickness of the material that the same may be satisfactorily wound in a flat spiral rather than in a coil, as has hitherto been the practice with springs formed from round stock. It is to be noted that I leave one or both ends of the material unreduced, providing, as shown in Fig. VIII, the portion 17 at one end and the portion 18 at the other, which portions being of round stock can be readily bent in any desired direction and to this extent obviates the objections heretofore present in the only forms of springs which could be wound in a flat spiral in that the flat material of the springs could only be bent transversely and when bent transversely, on account of the thickness of the material, had a great tendency to break the springs, thus proving unsatisfactory.

In that form of my invention shown in Figs. I, II and III, I employ a blank substantially as shown in Fig. VI and have the pivot bearing member secured in place by the shoulder 19 of the screw 20 which passes downward through the bearing, said screw having at its upper end the head 21 formed with a notch or plurality of notches 22. It will be understood that while in this figure I have shown the pivot bearing for the lever and the locking screw as both disposed on the same side of the bridge that if desired they could be disposed on opposite sides of the bridge and the spring on one side of the bridge, the lever on the other, or in place of employing the particular type of screw and pivot bearing member shown in this figure, I may with equal facility, make use of any other desired construction of pivot member.

In use, as will be most clearly understood by reference to Fig. III, the portion 13 of my spring is wound in a flat spiral while the pivot screw or portion projecting above the flange 8 is disposed in the center of the spiral and serves to retain the same against lateral displacement, the head 21 resting on top of the inner convolution to lock the spring against accidental upward movement. If desired, however, in place of having this head, or in addition thereto, I may pass the end 18 of the spring under the strap portion of the clip, a recess 24' being formed in said strap portion to hold the end of the spring and prevent upward movement of the spring relative to the remainder of the mounting. As shown in the drawings, the portion 18 of the spring projects upwardly through the notch 22 in the head 21 and is laterally bent to engage the lens clip. On account of the resiliency of the spring as the member 20 is screwed into place the portion 18 will yield outwardly but will spring inward into locking engagement with one of the notches 22, when the same is brought into alinement with the spring, thus tending to lock the pivot against any possible accidental loosening. The resting of the portion 18 against the clip, it will be understood, secures this end of the spring against rotation while lateral bending of the portion 18 will serve to vary the position of the inner end of the spiral and consequently to increase or decrease the tension of the spring as may prove advantageous. The outer end 17 of the spring is preferably tied around the lever arm 5 and the excess cut off.

From the foregoing description taken in connection with the accompanying drawings, the construction and use of my improved glasses should be readily understood, and it will be seen that I have provided a novel, inconspicuous, efficient and desirable spring, which may be readily applied to a mounting and whose ends are each of substantially the same diameter in their two principal meridians, whereby they may be readily adjusted by bending in any desired direction.

I claim:

1. In an ophthalmic mounting, the combination of guard levers pivoted on the mounting, actuating springs for the guard levers, said springs comprising a central portion coiled in a flat spiral around the pivots, and a reduced pliable inner end bent out across the coil to engagement with the mounting.

2. A spring for actuating the guard levers of an ophthalmic mounting, comprising a central portion wound in a flat spiral, a reduced pliable inner end bent out across the coil for engagement with the mounting, and a reduced pliable outer end for engagement with the guard levers.

3. A spring for actuating the guard levers of an ophthalmic mounting, comprising a central portion coiled in a flat spiral, and a reduced round pliable inner end bent out across the coil for engagement with the guard levers.

4. In an ophthalmic mounting the combination of guard levers pivoted on the mounting, actuating springs for the guard levers, said springs comprising a central portion coiled in a flat spiral around the pivots, and a reduced pliable inner end bent out across the coil for engagement with the mounting and a cover on the pivot over the spring having a recess for the end of the spring.

In testimony whereof I affix my signature in presence of two witnesses.

HARRY H. STYLL.

Witnesses:
H. K. PARSONS,
F. E. CODERRE.

Copies of this patent may be obtained for five cents each, by addressing the "Commissioner of Patents, Washington, D. C."